(12) United States Patent
Ishikawa et al.

(10) Patent No.: US 8,596,407 B2
(45) Date of Patent: Dec. 3, 2013

(54) INTEGRAL POWER STEERING APPARATUS

(75) Inventors: Shogo Ishikawa, Saitama (JP); Sosuke Sunaga, Higashimatsuyama (JP)

(73) Assignee: Hitachi Automotive Systems Steering, Ltd., Hiki-gun (JP)

( * ) Notice: Subject to any disclaimer, the term of this patent is extended or adjusted under 35 U.S.C. 154(b) by 25 days.

(21) Appl. No.: 13/397,231

(22) Filed: Feb. 15, 2012

(65) Prior Publication Data
US 2012/0241242 A1 Sep. 27, 2012

(30) Foreign Application Priority Data
Mar. 24, 2011 (JP) ................................. 2011-065349

(51) Int. Cl.
*B62D 5/06* (2006.01)
(52) U.S. Cl.
USPC ............ 180/417; 180/421; 180/432; 180/433
(58) Field of Classification Search
USPC .................. 180/417, 421, 432, 433, 434, 439
See application file for complete search history.

(56) References Cited

U.S. PATENT DOCUMENTS

| | | | | |
|---|---|---|---|---|
| 5,660,247 A | * | 8/1997 | Lang | 180/421 |
| 6,408,975 B1 | * | 6/2002 | Bishop et al. | 180/422 |
| 6,779,625 B2 | * | 8/2004 | Sonoda et al. | 180/422 |
| 6,782,966 B2 | * | 8/2004 | Sahr et al. | 180/428 |
| 6,896,093 B2 | | 5/2005 | Ishikawa et al. | |
| 2003/0141140 A1 | * | 7/2003 | Wienecke | 180/441 |

FOREIGN PATENT DOCUMENTS

JP      2005-022636 A      1/2005

* cited by examiner

*Primary Examiner* — Kevin Hurley
*Assistant Examiner* — Michael Stabley
(74) *Attorney, Agent, or Firm* — Foley & Lardner LLP

(57) ABSTRACT

An integral power steering apparatus includes a hydraulic actuator having a piston separating pressure chambers for steering assistance and a limiter valve to be opened by movement of the piston to fluidly connect the pressure chambers. The limiter valve includes an adjuster for adjusting a press-fit position of a spring pin press fit in a plunger. The adjuster includes a movable adjusting member formed with an abutting surface to abut against the plunger to limit rearward plunger movement when the movable adjusting member is at a first adjuster position, and a regulating member to hold the movable adjusting member at the first adjuster position at the time of adjustment, and to enable the movable adjusting member to move to a second adjuster position after adjustment.

8 Claims, 9 Drawing Sheets

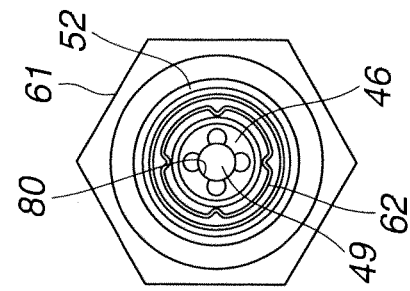
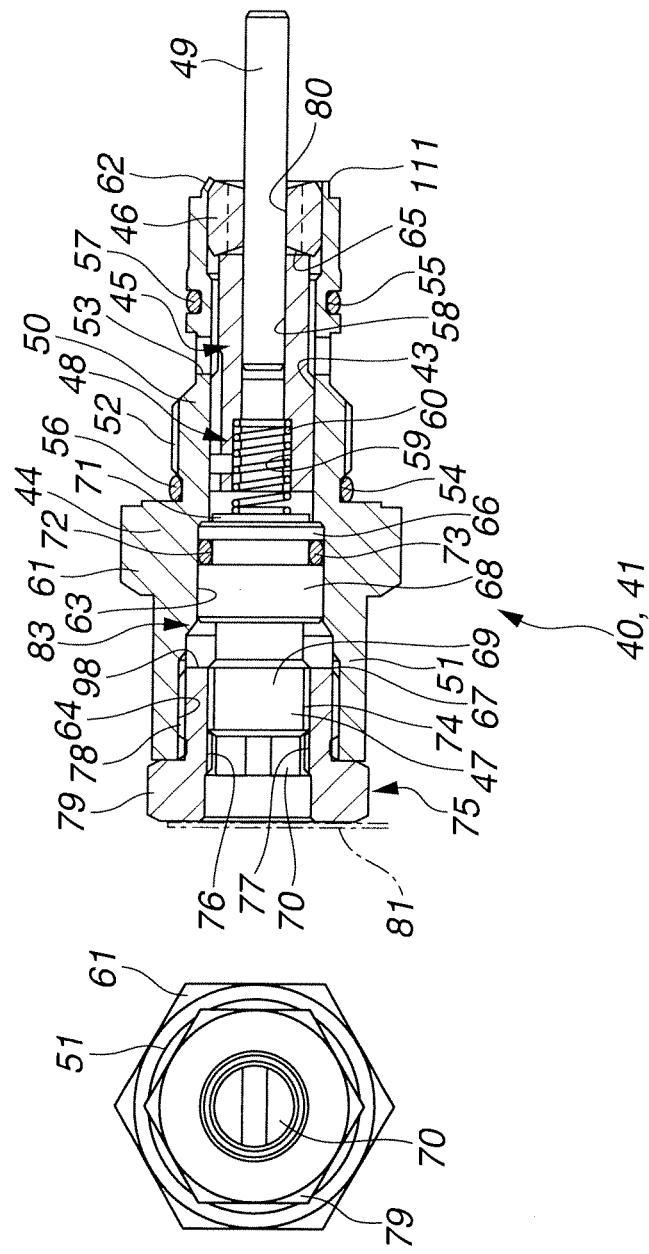
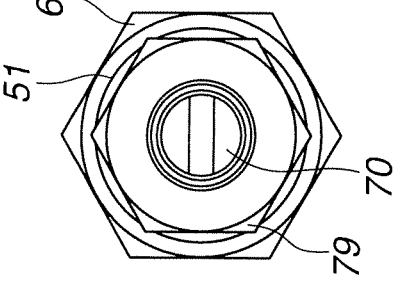

INTEGRAL POWER STEERING APPARATUS

BACKGROUND OF THE INVENTION

The present invention relates to power steering apparatus such as integral power steering apparatus.

A Japanese patent document JP 2005-22636A (≈U.S. Pat. No. 6,896,093 B2) shows an integral power steering apparatus including a stroke limiter valve for limiting the stroke of a piston in a hydraulic actuator for steering assistance. The stroke limiter valve includes a plunger and a spring pin press fit in the plunger. The spring pin is arranged to open to decrease the assist hydraulic pressure, by being pushed by movement of the piston (by abutment with the piston or a sector gear) when the piston reaches a predetermined (limit or critical) position.

SUMMARY OF THE INVENTION

In the technique of the above-mentioned patent document, if the steering operation is continued despite the decrease of the assist hydraulic pressure, the steering pin may be further inserted forcibly into the plunger beyond the correct press-fit position, and thereby cause an undesired shift, from the predetermined (limit or critical) position, of the piston position at which the spring pin abuts against the piston (or the sector gear).

Therefore, it is an object of the present invention to provide a power steering apparatus adapted to prevent undesired shift of the piston position for the abutment between the spring pin and the piston (or the sector gear).

According to one aspect of the present invention, a power steering apparatus comprises: a hydraulic actuator including a piston separating first and second pressure chambers from each other for steering assistance; and at least one limiter valve (first or second valve) to be opened by movement of the piston to make fluid connection between the first and second pressure chambers when the piston reaches a predetermined limit piston position. The limiter (first or second) valve includes: a valve casing including a plunger receiving portion and a valve seat; a plunger slidably received in the plunger receiving portion of the valve casing and arranged to close the limiter valve by moving in a forward direction toward the valve seat and abutting on the valve seat and to open the limiter valve by moving in a rearward direction away from the valve seat; a coil spring to urge the plunger in the forward direction toward the valve seat; a spring pin which includes a forward end portion adapted to be pushed in the rearward direction by the movement of the piston when the piston reaches the predetermined limit piston position, and a rearward end portion press fit in the plunger to move the plunger in the rearward direction to open the limiter valve when pushed by the movement of the piston; and ae press-fit position (or stroke) adjuster disposed in the valve casing, for adjusting a press-fit position of the spring pin press fit in the plunger. The press-fit position adjuster includes a movable adjusting member formed with a forward abutting surface to abut against the plunger to limit rearward movement of the plunger when the movable adjusting member is located at a first adjuster position in the valve casing, and a regulating member to hold the movable adjusting member at the first adjuster position at a time of a press-fit position adjustment, and to enable the movable adjusting member to move from the first adjuster position to a second adjuster position in the rearward direction after the press-fit position adjustment.

BRIEF DESCRIPTION OF THE DRAWINGS

FIG. 2 is an enlarged view of first or second valve 40 or 41 (limiter valve) according to the first embodiment. FIG. 2A is a partial longitudinal or axial sectional view of first or second valve 40 or 41. FIG. 2B is an end view of first or second valve 40 or 41 as viewed from the outer side of a steering housing 11. FIG. 2C is an end view of first or second valve 40 or 41 as viewed from the inner side of steering housing 11.

FIG. 4 is an enlarged view of first or second valve 40 or 41 (limiter valve) according to a second embodiment.

FIG. 6 is an enlarged view of first or second valve 40 or 41 (limiter valve) according to a third embodiment.

FIG. 8 is an enlarged view of first or second valve 40 or 41 (limiter valve) according to a further embodiment.

DETAILED DESCRIPTION OF THE INVENTION

[First Embodiment]

[Overall Construction of Integral Power Steering Apparatus]

Figure 1:
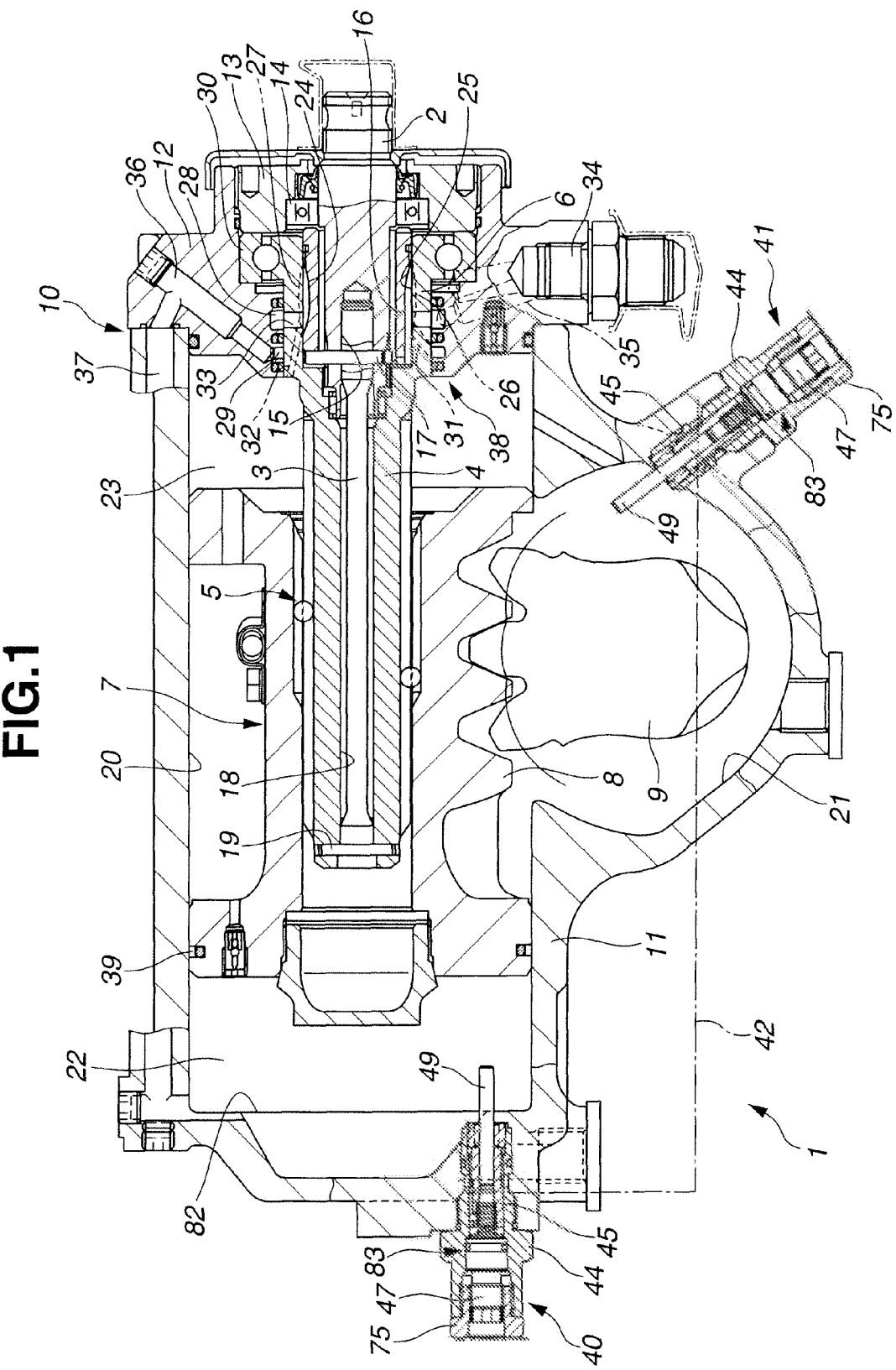
FIG. 1 is a longitudinal sectional view of an integral power steering apparatus according to a first embodiment of the present invention.

FIG. 1 is a longitudinal sectional view of an integral power steering apparatus 1 according to a first embodiment of the present invention. The overall construction of the integral power steering apparatus 1 is explained with reference to FIG. 1. The integral power steering apparatus 1 includes: a stub shaft 2 (input shaft) adapted to be connected with a steering wheel; a screw shaft 4 connected through a torsion bar 3 with stub shaft 2; a valve body 6 which, in this embodiment, is formed integrally with screw shaft 4; a piston 7 (piston of a hydraulic actuator) provided on screw shaft 4 through a ball screw mechanism 5 so that the piston 7 can move axially; and a sector gear 9 engaging with a rack 8 formed in piston 7.

A housing 10 encloses the mechanism of integral power steering apparatus 1. Housing 10 includes a steering housing 11 enclosing piston 7 and sector gear 9, a valve housing 12 supporting the screw shaft 4 rotatably, and a cover 13 supporting the stub shaft 2 rotatably.

The stub shaft 2 is supported rotatably on cover 13 through a ball bearing 14. Stub shaft 2 includes a first side portion formed with a hollow portion 15 (on the left side as viewed in FIG. 1). A second end portion (right end portion) of torsion bar 3 is inserted into the hollow portion 15 of stub shaft 2. The outside circumference of the first (left) side portion of stub shaft 2 is inserted in, and surrounded by, an inside circumference of a rotor 16 formed substantially in the form of a circular hollow cylinder. The stub shaft 2, the second (right) end portion of torsion bar 3 and rotor 16 are fixed together by a pin 17 so that the stub shaft 2, torsion bar 3 and rotor 16 rotate as a unit.

The screw shaft 4 and valve body 6 (integral with screw shaft 4) are supported rotatably on valve housing 12 through a ball bearing 30. Screw shaft 4 is formed with a hollow portion 18 for receiving the torsion bar 3. The torsion bar receiving hollow portion 18 of screw shaft 4 extends axially and communicates with a rotor receiving hollow portion 25 formed in valve body 6. Torsion bar 3 is received in the torsion bar receiving hollow portion 18 of screw shaft 4. A first (left) end portion of torsion bar 3 is connected or fixed with a first (left) end portion of screw shaft 4 by a pin 19. Rotor 16 is received in the rotor receiving hollow portion 25 of valve body 6.

Piston 7 (of the hydraulic actuator) is received in a cylinder portion or bore 20 formed in the form of a cylinder in the steering housing 11. The cylinder portion 20 extends axially from a second (right) end which is open, to a first (left) end which is closed by a bottom 82. Sector gear 9 is received in a gear chamber 21 of steering housing 11. The gear chamber 21 bulges radially outward from the cylinder portion 20.

A piston seal 39 is installed in the outer circumference of piston 7. This piston seal 39 separates first pressure chamber 22 and second pressure chamber 23 from each other. First pressure chamber 22 is defined, on the first side (left side as viewed in FIG. 1) of piston seal 39, in the cylinder portion 20. Second pressure chamber 23 is formed by the second (right) side of piston seal 39 in the cylinder portion 20, and the gear chamber 21.

Sector gear 9 is connected with a link member which, in this example, is a pitman arm for transmitting rotational motion of the sector gear 9 through a link mechanism to steerable wheel or wheels of a vehicle. (The link member can serve as at least a part of a transmitting mechanism or a linkage for transmitting rotational motion of sector gear 9 to one or more steerable wheels of the vehicle.)

Changeover grooves 24 are formed in the outer circumference of rotor 16 in the axial direction. Changeover grooves 24 are arranged at regular intervals. In the inside circumferential surface of the rotor receiving portion 25 of valve body 6, there are formed first and second axial grooves 26 and 27. In the inside circumference of valve housing 12, there are formed an inlet side circumferential groove 28 and first pressure chamber's side circumferential groove 29 which are spaced in the axial direction from each other.

Valve body 6 is formed with first, second and third fluid passages 31, 32 and 33. The first fluid passage 31 connects the first axial groove 26 and the first pressure chamber side circumferential groove 29 with each other. The second fluid passage 32 connects the second axial groove 27 and the second pressure chamber 23 with each other. The third fluid passage 33 extends radially and connects the outer side and the inner side of valve body 6 with each other.

Valve housing 12 is formed with an intake port 34 to be connected with an oil pump, a fourth fluid passage 35 communicating with the intake side circumferential groove 28, and a fifth fluid passage 36 connected with first pressure chamber's side circumferential groove 29. Steering housing 11 is formed with a sixth fluid passage 37 connecting the fourth fluid passage 35 and the first pressure chamber 22 with each other.

A control valve 38 is formed by the changeover grooves 24 of rotor 16, and the first and second axial grooves 26 and 27 of valve body 6. The control valve 38 is a valve for changing over the supply destination of the operating oil from the oil pump between first pressure chamber 22 and second pressure chamber 23 in accordance with the quantity of relative rotation between stub shaft 2 and valve body 6.

First valve 40 and second valve 41 (limiter valves) are installed in steering housing 11. The first valve 40 is directed to first pressure chamber 22. The second valve 41 is directed to second pressure chamber 23 (gear chamber 21). First and second valves 40 and 41 constitute a stroke limiter for limiting the stroke of piston 7. First and second valves 40 and 41 are connected together by a seventh fluid passage 42 formed in steering housing 11.

[Details of Each Valve]

FIG. 2 is an enlarged view of first or second valve 40 or 41. FIG. 2A is a partial longitudinal or axial sectional view of the first or second valve 40 or 41. FIG. 2B is an end view of the first or second valve 40 or 41 as viewed from the outer side of steering housing 11. FIG. 2C is an end view of first or second valve 40 or 41 as viewed from the inner side of steering housing 11. In this example, first and second valves 40 and 41 are identical in construction to each other.

Each of first and second valves 40 and 41 includes: a valve body 44 having therein a plunger receiving portion 43; a plunger 45 slidably received in the plunger receiving portion 43; a valve seat (or seat portion) 46 abutting on plunger 46 at the time of valve closure; a stroke adjusting member 83 (47, 75) provided behind plunger 45; a coil spring 48 disposed between plunger 45 and stroke adjusting member 83; and a spring pin 49 press fit (axially) in plunger 45. Each of first and second valves 40 and 41 may be constructed to include a valve casing (44, 46) including a plunger receiving (hollow) portion (43) and a valve seat or valve seat portion (46).

[Construction of Valve Body]

Valve body 44 includes an inner portion (or inserted portion or forward portion) 50 inserted in steering housing 11, and an outer portion (or non-inserted portion or rearward portion) 51 having a cross sectional size (or diameter) greater than a cross sectional size (or diameter) of inner portion 50. In the installed state shown in FIG. 1, the outer (non-inserted) portion 51 of each valve 40 or 41 projects outward from steering housing 11 without being inserted in steering housing 11. Outer portion 51 includes a noncircular head 61 (hexagonal in the example of FIG. 2). Inner portion 50 includes an externally threaded portion (or male screw portion) 52 formed in the outer circumference of inner portion 50. The first or second valve 40 or 41 is screwed into steering housing 11 by turning the noncircular head 61 of valve body 44 with a tool such as a screw wrench (or spanner).

Valve body 44 includes a through hole 53 extending radially inwards from the outer circumference of valve body 44 to the plunger receiving portion 43, at an axial position adjacent to the threaded portion 52. This through hole 53 is connected with seventh fluid passage 42. Valve body 44 further includes annular grooves 54 and 55 (or O ring fitting grooves) formed in the outer circumference of inner portion 50 at such axial positions that the threaded portion 52 and through hole 53 are located axially between the annular grooves 54 and 55. O rings 56 and 57 are fit, respectively, in annular grooves 54 and 55.

Valve body 44 further includes a movable stopper receiving portion 63 formed behind the plunger receiving portion 43. The movable stopper receiving portion 63 communicates with the plunger receiving portion 43. Behind the movable stopper receiving portion 63, there is further formed a fixed stopper receiving portion 64 communicating with the movable stopper receiving portion 63. The movable stopper receiving portion 63 is greater in diameter or cross sectional size than the plunger receiving portion 43, and there is formed, between the movable stopper receiving portion 63 and the plunger receiving potion 43, an annular step including an annular shoulder surface 66 serving as a movable stopper abutment surface (facing axially toward the rearward end of valve body 44 (left end in FIG. 2A)). The fixed stopper receiving portion 64 is formed with an internally threaded (female screw) portion 67. The plunger receiving portion 43 extends axially to an open inner end on the steering housing's side (or a forward end that is a right end as viewed in FIG. 2A). Around the open inner end of plunger receiving portion 43, there is formed a staking portion 62 made thinner in wall thickness than the remaining circumferential wall. The staking portion 62 is a portion adapted for staking (or caulking or crimping). The valve body 44 includes an axially extending stepped inside bore which is formed by the plunger receiving portion 43 of a smaller cross sectional size located on the forward side, the movable stopper receiving portion 63 of a medium cross sectional size located between the plunger receiving portion 43 and the fixed stopper receiving portion 64, and the fixed stopper receiving portion 64 of a larger cross sectional size located on the rearward side.

<Construction of Plunger>

Plunger 45 is a hollow member including an axially extending stepped through hole including a smaller segment 58 having a smaller sectional size or diameter and serving as a spring pin receiving portion, a larger segment 59 having a larger sectional size or diameter and serving as a coil spring receiving portion, and a step shoulder surface 60 serving as a spring seat. The shoulder surface 60 is an annular surface facing axially in the rearward direction toward the rear end of the valve body 44 in this example.

<Construction of Valve Seat (Seat Portion)>

Valve seat (or seat portion) 46 of the valve 40 or 41 is a hollow cylindrical portion or member having an axially extending through hole 80 serving as a spring pin receiving portion. Valve seat 46 includes an outer inclined surface 111 serving as a staking abutting portion (formed at the forward end of valve seat 46) and an inner inclined surface 65 serving as a seat surface (formed at the rearward end of valve seat 46). The outer inclined surface 111 extends, obliquely as viewed in FIG. 2A, from an intermediate point so located that a radial distance from the outside circumference of valve seat 46 is equal to about one-third of the wall thickness of the cylindrical wall, to an outer point on the outside circumference of valve seat 46. In this example, the outer inclined surface 111 is in the form of an outside conical surface. The inner inclined surface 65 serving as the seat surface extends, obliquely as viewed in FIG. 2A, from an intermediate point so located that a radial distance from the outside circumference of valve seat 46 is equal to about one-third of the wall thickness of the cylindrical wall, to an inner point on the inside circumference of valve seat 46. In this example, the inner inclined surface 65 is in the form of an inside conical surface. In this example, the outer inclined surface (111) and the inner inclined surface (65) are formed on both ends of valve seat 46.

<Construction of Spring Pin>

Spring pin 49 is in the form of a rod having a circular cross section. The outside diameter of spring pin 49 is so set as to enable press-fitting of spring pin 49 in the spring pin fitting portion 58 of plunger 45.

<Construction of Stroke Adjusting Member>

Stroke adjusting member 83 is formed by a movable stopper 47 (movable adjusting member) and a fixed stopper 75 (regulating or holding member). Movable stopper 47 includes a stopper portion 68, a screw portion 69, and a screw head 70. The outside diameter of stopper portion 68 is slightly smaller than the inside diameter of the movable stopper receiving portion 63 of valve body 44 so that the stopper portion 68 can be inserted into the movable stopper receiving portion 63. The stopper portion 68 includes a forward end formed with a spring seat 71. The outside diameter of spring seat 71 is smaller than the inside diameter of plunger receiving portion 43 of valve body 44 so that the spring seat 71 can be inserted into the plunger receiving portion 43. Stopper portion 68 includes the outside circumference formed with an annular groove 72 serving as an O ring fitting groove. An O ring 73 is fit in the O ring fitting annular groove 72.

The screw portion 69 is formed behind the stopper portion 68. Screw portion 69 includes the outside circumference formed with an externally threaded portion (or male screw portion) 74. The screw head 70 is formed behind the screw portion 69.

The fixed stopper 75 includes a movable stopper receiving portion 76 extending through the fixed stopper 75, and an internally threaded (female screw) portion 77 formed in the inside circumference of the movable stopper receiving portion 76. Fixed stopper 75 further includes an externally threaded portion 78 formed in the outside circumference, and a noncircular (hexagonal) head 79. Fixed stopper 75 further includes a forward end surface (such as an annular surface) serving as a movable stopper abutment surface 98.

<Assembly Operation of Each Valve>

Movable stopper 47 is screwed into the movable stopper receiving portion 76 of fixed stopper 75. Fixed stopper 75 with movable stopper 47 screwed into movable stopper receiving portion 76 is screwed into the fixed stopper receiving portion 64 of valve body 44. In this case, the stopper portion 68 of movable stopper 47 abuts against the movable stopper abutment surface 66 of valve body 44, and the spring seat 71 is inserted in plunger receiving portion 43. In this state, the movable stopper 47 of first valve 40 is located at a predetermined position referred to as a first position with respect to valve body 44, and the movable stopper 47 of second valve 41 is located at a predetermined position referred to as a third position with respect to valve body 44 of second valve 41.

Spring pin 49 is forcibly fit in the spring pin fitting portion 58 of plunger 45. In this case, spring pin 49 is inserted so that the forcible fitting position is relatively short. In this state, the valve seat 46 is inserted from the forward end of spring pin 49 (from the right side as viewed in FIG. 2A). In the state in which the spring pin 49 and valve seat 46 are installed, and the coil spring 48 is inserted in the coil spring receiving portion 59 of plunger 45, the plunger 45 is received slidably in the forward and rearward directions in the plunger receiving portion 43 of valve body 44. The staking portion 62 of the forward end of plunger receiving portion 43 of valve body 44 is joined by staking along the shape of the staking abutment portion 111 of valve seat 46, at a plurality of positions (four positions in this example) arranged regularly in the circumferential direction.

After the assembly of the valve 40 or 41, an opening of the movable stopper receiving portion 76 of fixed stopper 75 is closed by a seal 81.

In the thus-assembled valve 40 or 41, the movable stopper 47 is held at the first position (or the third position) with respect to valve body 44. Coil spring 48 is held between the spring seat 60 of plunger 45 and the spring seat 71 of movable stopper 47 and arranged to urge the plunger 45 in a valve closing direction to cause the forward end of plunger 45 to abut against the seat surface 65 of valve seat 46.

When the spring pin 49 is pushed with a force acting against the resilient force of coil spring 48, the plunger 45 can be moved up to the position abutting against the spring seat 71 of movable stopper 47. The coil spring 48 of each of valves 40 and 41 is so set (or formed by a spring so selected to have such strength or characteristics) that the valve 40 or 41 is opened when the pressure is supplied to the first pressure chamber 22 or the second pressure chamber 23, and the pressure becomes higher than a predetermined pressure level, and that the valve 40, 41 is closed when the operating oil is not supplied to the first or second pressure chamber 22 or 23 and the pressure becomes lower than a predetermined pressure level.

[Adjustment of Press-Fit Position of Spring Pin]

Figure 3:
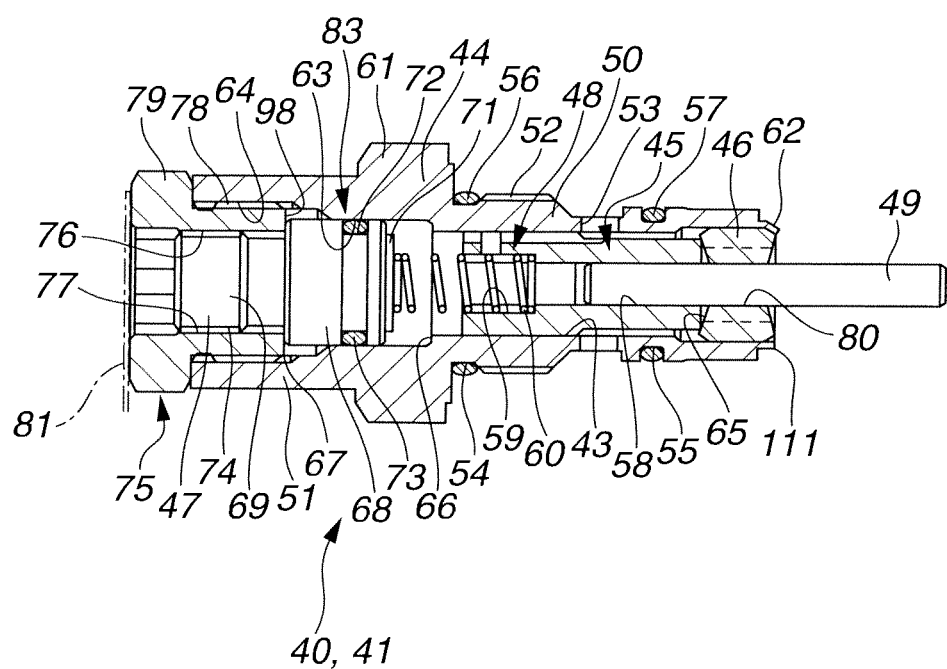
FIG. 3 is an enlarged view showing the first or second valve 40 or 41 after a press-fit position adjustment of a spring pin 49 according to the first embodiment.

FIG. 3 is an enlarged view showing the first or second valve 40 or 41 after a press-fit position adjustment of spring pin 49 with respect to the spring pin fitting portion 58 of plunger 45. The spring pin fitting position adjusting operation is explained hereinafter with reference to FIGS. 1~3.

The first and second valves 40 and 41 are installed in steering housing 11, in the assembled state shown in FIG. 2. In the assembled state shown in FIG. 1, the forward end of spring pin 49 of first valve 40 projects into the first pressure chamber 22, and the axis of first valve 40 or steering pin 49 extends along the sliding direction or axial direction of piston 7. In the assembled state shown in FIG. 1, the forward end of spring pin 49 of second valve 41 projects into the gear chamber 21 (second pressure chamber 23), and the axis of second valve 41 or steering pin 49 extends in a rotational direction of sector gear 9. In this example, the axis of second valve 41 is not parallel to the axis of piston 7 unlike first valve 40.

At the time of the press-fit position adjustment of spring pin 49 of first valve 40, the end of piston 7 abuts against the spring pin 49 of first valve 40 by rotating the steering wheel so as to move the piston 7 toward the first pressure chamber 22. With further rotation of the steering wheel, the plunger 45 moves together with spring pin 49 toward the movable stopper 47, and the plunger 45 abuts on the spring seat 71. With further rotation of the steering wheel, the plunger 45 is held by abutment with spring seat 71 and hence the spring pin 49 is fit or inserted forcibly into the spring pin receiving portion 58 of plunger 45. At the time of the adjustment, the press-fit position of spring pin 49 is determined by turning the steering wheel to a position just before abutment of the link mechanism against a link stopper. The position of the piston 7 corresponding to the thus-determined press-fit position of spring pin 49 is referred to as a first predetermined position.

At the time of the press-fit position adjustment of spring pin 49 of second valve 41, a side surface of sector gear 9 abuts against the forward end of spring pin 49, by rotating the steering wheel so as to move the piston 7 toward the second pressure chamber 23. The adjusting method per se of second valve 41 is similar to the spring pin fitting position adjustment of spring pin 49 of first valve 40. At the time of the press-fit position adjustment of spring pin 49 of second valve 41, the position of piston 7 just before abutment of the link mechanism against the link stopper is referred to as a second predetermined position.

Thus, just before abutment of a steerable wheel against the link stopper, the valve 40 or 41 is opened by abutment of the spring pins 49 against piston 7 or sector gear 9.

After the adjustment of the press-fit position of spring pin 49, the seal 81 is removed and the movable stopper 47 is moved by rotating movable stopper 47, up to the position at which the stopper portion 68 of movable stopper 47 abuts against the movable stopper abutment wall 98 of fixed stopper 75. In this state, the position of movable stopper 47 with respect to the valve body 44 is referred to as a second position in the case of first valve 40, and as a fourth position in the case of second valve 41. By this operation, it is possible to increase the spacing between the plunger 45 and the spring seat 71 of movable stopper 47, as compared to the state shown in FIG. 2. Thereafter, the open end of movable stopper receiving portion 76 of fixed stopper 75 is closed again by the seal 81.

[Operations]

<Steering Assisi Function>

When the steering wheel is turned in the direction to cause the piston 7 to move toward first pressure chamber 22, the control valve 38 supplies the operating oil to second pressure chamber 23. The operating oil discharged from the oil pump is supplied to the second pressure chamber 23 through intake port 34→fourth fluid passage 35→first axial groove 26→third fluid passage 33→changeover groove 24 second axial groove 27→second fluid passage 32. Therefore, the pressure in second pressure chamber 23 increases, and provides an assist force for assisting the movement of piston 7 toward first pressure chamber 22, so that the driver can turn the steering with lighter effort.

When the steering wheel is turned in the direction to cause the piston 7 to move toward second pressure chamber 23, the control valve 38 supplies the operating oil to first pressure chamber 22. The operating oil discharged from the oil pump is supplied to the first pressure chamber 22 through intake port 34→fourth fluid passage 35→first axial groove 26 third fluid passage 33→changeover groove 244 first axial groove 264 first fluid passage 314 first pressure chamber circumferential groove 29→fifth fluid passage 364 sixth fluid passage 37. Therefore, the pressure in first pressure chamber 22 increases, and provides an assist force for assisting the movement of piston 7 toward second pressure chamber 23, so that the driver can turn the steering with lighter effort.

<Limiter Function>

When the steering wheel is turned so as to cause piston 7 to move toward first pressure chamber 22, the operating oil is supplied to second pressure chamber 23 by control valve 38. When the pressure in second pressure chamber 23 becomes higher than the predetermined pressure, the second valve 41 opens and supplies the operating oil to second fluid passage 42. Since no operating oil is supplied to first pressure chamber 22, the pressure in first pressure chamber 22 is lower than a predetermined pressure and the first valve 40 is closed. Namely, although the operating oil is introduced into the seventh fluid passage 42, the operating oil is not supplied from the seventh fluid passage 42 into first pressure chamber 22.

When piston 7 abuts against the spring pin 49 of first valve 40, the first valve 40 is opened. Therefore, the operating oil is supplied from second pressure chamber 23 through seventh fluid passage 42 into first pressure chamber 22, and the pressures in first and second pressure chambers 22 and 23 become equal to each other. Consequently, the assist force for moving the piston 7 toward first pressure chamber 22 is eliminated, and the piston 7 is moved toward first pressure chamber 22 only by the driver's force (steering force) to turn the steering wheel.

Similarly when the steering wheel is turned to cause piston 7 to move toward first pressure chamber 22, the second valve 41 is opened by abutment of sector gear 9 against the spring pin 49 of second valve 41. Therefore, the operating oil is supplied from first pressure chamber 22 through seventh fluid passage 42 into second pressure chamber 23, and the pressures in second and first pressure chambers 23 and 22 become equal to each other. Consequently, the assist force for moving the piston 7 toward second pressure chamber 23 is eliminated, and the piston 7 is moved toward second pressure chamber 23 only by the driver's force (steering force) to turn the steering wheel. Therefore, the assist force by the pressure of the operating oil is eliminated after the abutment of the steering link mechanism against the link stopper, and hence damage of the link mechanism is prevented.

<Press-fit Position Change Preventing Function>

After the abutment of the link mechanism against the link stopper, it is normally unfeasible to turn the steering wheel further. However, if the steering wheel is turned forcibly with a greater force, it is possible to turn the steering wheel further to an amount corresponding to torsion of the link mechanism. In an earlier technology (???JP 2005-22636A??? (≈U.S. Pat. No. 6,896,093 B2), the movable stopper 47 is fixed at the first position (the position shown in FIG. 2) after the press-fit position adjustment of spring pin 49. If the steering wheel is turned to the amount corresponding to the torsion of the link mechanism with the movable stopper 47 held at the first position, then the plunger 45 abuts against the spring seat 71 of movable stopper 47 and the spring pin 49 may be inserted further forcibly. Therefore, even after the abutment of the link mechanism against the link stopper, the valve 40 or 41 on the pressure chamber 22 or 23 on the lower pressure side is held closed without being opened, and the assist force is added continuously by the operating oil. As a result, the link mechanism might be damaged by the continuation of application of the assist force by the operating oil in addition to the driver's steering force to the link mechanism in the state in which the link stopper abuts against the link mechanism and thereby limits the movement of the link mechanism.

Therefore, in the integral power steering apparatus 1 according to the first embodiment of the present invention, the movable stopper 47 is arranged to be moved to the second position (the position shown in FIG. 3) after the press-fit position adjustment of spring pin 47. Therefore, the spring seat 71 of movable stopper 47 can be spaced from plunger 45. Consequently, even if a great force is applied to the steering wheel after the abutment of the link stopper against the link mechanism, the plunger 45 is spaced from the spring seat 71 of movable stopper 47 without abutting against the spring seat 71, and hence the spring pin 49 is held at the press-fit position at the time of the adjustment without being further inserted. Moreover, in the illustrated example, the movable stopper 47 is screwed into the movable stopper receiving portion 76 of fixed stopper 75. Therefore, the position of movable stopper 47 can be adjusted easily.

[Effects] The integral power steering apparatus according to the first embodiment can provide following effects and advantages.

(1) The integral power steering apparatus comprises: a housing (10); a stub shaft (2) (input shaft) adapted to be connected with a steering wheel (of a vehicle); a piston (7) received in the housing and arranged to divide an inside cavity of the housing into a first pressure chamber (22) and a second pressure chamber (23); a ball-screw mechanism (5) (first translating mechanism) provided between the stub shaft and the piston and arranged to translate rotational motion of the stub shaft into linear motion of the piston in an axial direction; a rack provided or formed in an outer circumference of the stub shaft; a sector gear) engaged with the rack, disposed in the second pressure chamber and arranged to translate linear motion of the rack in the axial direction into rotational motion; a control valve (38) to supply an operating oil supplied from an external pressure source (oil pump), selectively to the first pressure chamber or the second pressure chamber; a transmitting mechanism (pitman arm) to transmit rotational motion of the sector gear to a steerable wheel (of the vehicle); and first and second valves (40, 41), the first valve being arranged to discharge a fluid pressure in the second pressure chamber toward the first pressure chamber when the piston moves to a first predetermined position in a first direction decreasing a volume of the first pressure chamber, and the second valve being arranged to discharge the fluid pressure in the first pressure chamber toward the second pressure chamber when the piston moves to a second predetermined position in a second direction decreasing a volume of the second pressure chamber. The first valve (40) is provided on the first pressure chamber's side, and the second valve (41) is provided on the second pressure chamber's side. Each of the first and second valves (40, 41) includes: a valve body (44) (first valve body, second valve body) formed with a (first or second) plunger receiving (hollow) portion (43); a plunger (45) (first plunger, second plunger) received in the (first or second) plunger receiving portion of the (first or second) valve body in such a slidable manner that the plunger can slide forwards and rearwards (in the axial direction); a valve seat or seat portion (46) (first valve seat, second valve seat) provided in the (first or second) valve body, arranged to form a part of a communication passage (42 etc.) connecting the first pressure chamber and the second pressure chamber with each other and arranged to shut off the communication passage by abutment with the (first or second) plunger (when the plunger is seated on the valve seat), and open the communication passage by separation or spacing of the (first or second) plunger from the (first or second) valve seat; a stroke adjusting member or device (83 (47, 75)) (first stroke adjusting member, second stroke adjusting member) which is provided in the (first or second) valve body and which includes a (first or second) spring seat; a coil spring (48) (first coil spring, second coil spring) which is seated on the (first or second) spring seat(for example, one end of the coil spring is retained by the spring seat) and which is arranged to urge the (first or second) plunger toward the (first or second) valve seat; and a spring pin (49) (first spring pin, second spring pin) which includes a first end portion (or rearward end portion) or press-fit in the (first or second) plunger and a second end portion (or forward end portion) adapted to abut on the piston or the sector gear (9) and which is arranged to separate or space the (first or second) plunger from the (first or second) valve seat by moving together with the (first or second) plunger by being pushed by the piston or the sector gear, and thereby to connect the first and second pressure chambers fluidly. The (first or second) stroke adjusting member or device (83) is arranged to lie or be held at a first position (third position) with respect to the (first or second) valve body at the time of adjustment of a press-fit position of the (first or second) spring pin with respect to the (first or second) plunger, and to limit movement of the (first or second) plunger by abutting on the (first or second) plunger. The (first or second) stroke adjusting member or device (83) is arranged to be held at a second position (forth position) located in a direction separating or spacing the stroke adjusting member (47) from the (first or second) plunger (45) after a press-fit position adjustment of the (first or second) spring pin.

Therefore, the integral power steering apparatus according to the first embodiment can move the stroke adjusting member (83) to the second or fourth position after the press-fit position adjustment of the spring pin (49), and thereby reduce the possibility of abutment of the plunger (45) against the stroke adjusting member (83) by the amount of movement of the stroke adjusting member (83) even when the spring pin (49) is pushed deeply. As a result, the integral power steering apparatus can restrain undesired forcible action pushing the spring pin (49) into the plunger (45), and thereby hold the press-fit position of the spring pin (49) at the adequate position at the time of the press-fit position adjustment.

(2) The stroke adjusting member (83) (first stroke adjusting member, second stroke adjusting member) includes a movable stopper (47) (first member, third member) including the (first or second) spring seat (71) and an externally threaded portion (74), and a fixed stopper (75) (second member, fourth member) which is provided in the valve body (44) and which includes an internally threaded portion (77) screwed over the externally threaded portion (74) of the movable stopper (47); and the stroke adjusting member (83) is arranged to be moved from the first position (the third position) to the second position (the fourth position) by rotating the movable stopper (47) with respect to the fixed stopper (75). Therefore, it is possible to adjust the position at which the movable stopper (47) is held, by a screwing operation. Thus, the position adjusting of the movable stopper is easy, and the retention of holding the movable stopper (47) at the correct position after the adjustment is secure.

[Second Embodiment]

An integral power steering apparatus according to a second embodiment is different from the apparatus according to the first embodiment, mainly in the construction of the stroke adjusting member or device 83. In the following explanation, the same component parts are given the same reference numerals and repetitive explanation is omitted.

[Details of Each Valve]

Figure 4C:
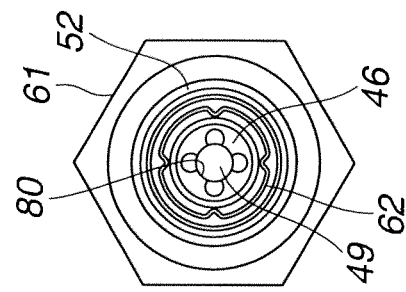
FIG. 4C is an end view of first or second valve 40 or 41 as viewed from the inner side of steering housing 11.
Figure 4A:
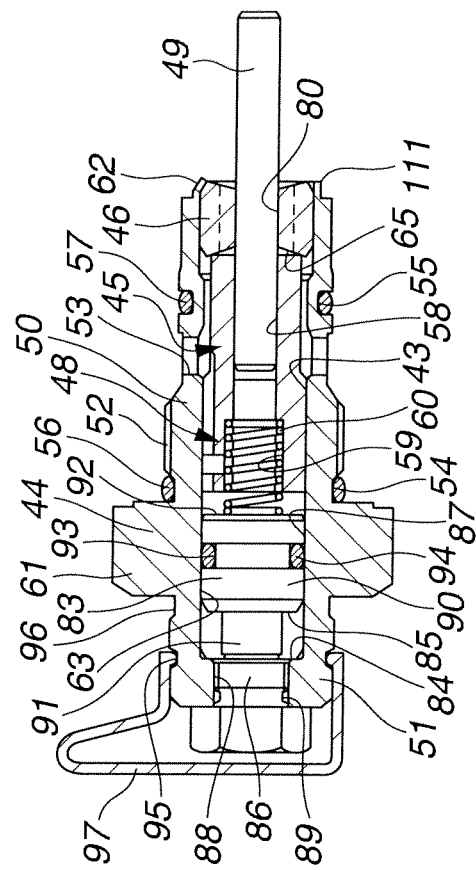
FIG. 4A is a partial longitudinal or axial sectional view of first or second valve 40 or 41.
Figure 4B:
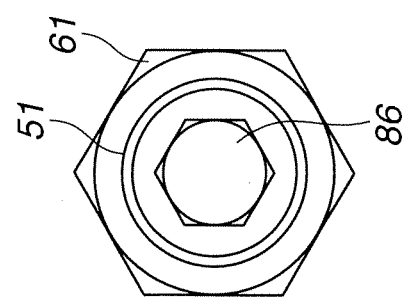
FIG. 4B is an end view of first or second valve 40 or 41 as viewed from the outer side of a steering housing 11.

FIG. 4 is an enlarged view of first or second valve 40 or 41. FIG. 4A is a partial longitudinal or axial sectional view of the first or second valve 40 or 41. FIG. 4B is an end view of the first or second valve 40 or 41 as viewed from the outer side of steering housing 11. FIG. 4C is an end view of first or second valve 40 or 41 as viewed from the inner side of steering housing 11. In this example, first and second valves 40 and 41 are identical in construction to each other.

Each of first and second valves 40 and 41 includes: a valve body 44 having therein a plunger receiving portion 43; a plunger 45 slidably received in the plunger receiving portion 43; a valve seat (or seat portion) 46 abutting on plunger 46 at the time of valve closure; a stroke adjusting member 83 (90, 91) provided behind plunger 45; a coil spring 48 disposed between plunger 45 and stroke adjusting member 83; and a spring pin 49 press-fit (axially) in plunger 45.

[Construction of Valve Body]

Valve body 44 includes an inner portion (or inserted portion or forward portion) 50 inserted in steering housing 11, and an outer portion (or non-inserted portion or rearward portion) 51 formed behind the inner portion 50. Outer portion 51 includes a noncircular head 61 (hexagonal in this example). Inner portion 50 includes an externally threaded portion (or male screw portion) 52 formed in the outer circumference of inner portion 50. The first or second valve 40 or 41 is screwed into steering housing 11 by turning the noncircular head 61 of valve body 44 with a tool such as a screw wrench (or spanner). On one side (rear side, left side in FIG. 4A) of the noncircular head 61, there are formed protector engagement grooves 95 and 96 extending circumferentially around the axis in the outside circumferential surface of the outer portion 51.

Valve body 44 includes a through hole 53 extending radially inwards from the outer circumference of valve body 44 to the plunger receiving portion 43, at an axial position adjacent to the threaded portion 52. This through hole 53 is connected with seventh fluid passage 42 (formed in steering housing 11 to connect the first and second valves 40 and 41). Valve body 44 further includes annular grooves 54 and 55 (or O ring fitting grooves) formed in the outer circumference of inner portion 50 at such axial positions that the threaded portion 52 and through hole 53 are located axially between the annular grooves 54 and 55. O rings 56 and 57 are fit, respectively, in annular grooves 54 and 55.

Valve body 44 further includes a stroke adjuster receiving portion 87 formed behind the plunger receiving portion 43. The stroke adjuster receiving portion 87 communicates with the plunger receiving portion 43. Behind the stroke adjuster receiving portion 87 (that is, on the rear side of stroke adjuster receiving portion 87), there is formed a bolt screw hole 88 having a cross sectional size or a diameter smaller than that of the stroke adjuster receiving portion 87. Between the stroke adjuster receiving portion 87 having the larger cross section on the forward side and the bolt screw hole 88 having the smaller cross section on the rearward side, there is formed an annular step shoulder surface 84 serving as an abutment surface on the body side. The bolt screw hole 88 includes an internally threaded potion 89 formed in the inside circumference. The plunger receiving portion 43 extends axially to an open inner end on the steering housing's side (or a forward end that is a right end as viewed in FIG. 4A). Around the open inner end of plunger receiving portion 43, there is formed a staking portion 62 made thinner in wall thickness than the remaining circumferential wall.

<Construction of Plunger>

Plunger 45 is a hollow member including an axially extending stepped through hole including a smaller segment 58 having a smaller sectional size or diameter and serving as a spring pin receiving portion, a larger segment 59 having a larger sectional size or diameter and serving as a coil spring receiving portion, and an annular step shoulder surface 60 serving as a spring seat.

<Construction of Valve Seat (Seat Portion)>

Valve seat (or seat portion) 46 of the valve 40 or 41 is a hollow cylindrical portion or member having an axially extending through hole 80 serving as a spring pin receiving portion. Valve seat 46 includes an outer inclined surface 111 serving as a staking abutting portion (formed at the forward end of valve seat 46) and an inner inclined surface 65 serving as a seat surface (formed at the rearward end of valve seat 46). The outer inclined surface 111 extends, obliquely as viewed in FIG. 4A, from an intermediate point so located that a radial distance from the outside circumference of valve seat 46 is equal to about one-third of the wall thickness of the cylindrical wall, to an outer point on the outside circumference of valve seat 46. In this example, the outer inclined surface 111 is in the form of an outside conical surface. The inner inclined surface 65 serving as the seat surface extends, obliquely as viewed in FIG. 4A, from an intermediate point so located that a radial distance from the outside circumference of valve seat 46 is equal to about one-third of the wall thickness of the cylindrical wall, to an inner point on the inside circumference of valve seat 46. In this example, the inner inclined surface 65 is in the form of an inside conical surface. In this example, the outer inclined surface (111) and the inner inclined surface (65) are formed on both ends of valve seat 46.

<Construction of Spring Pin>

Spring pin 49 is in the form of a rod having a circular cross section or round bar. The outside diameter of spring pin 49 is so set as to enable press-fitting of spring pin 49 in the spring pin fitting portion 58 of plunger 45.

<Construction of Stroke Adjusting Member>

Figure 5:
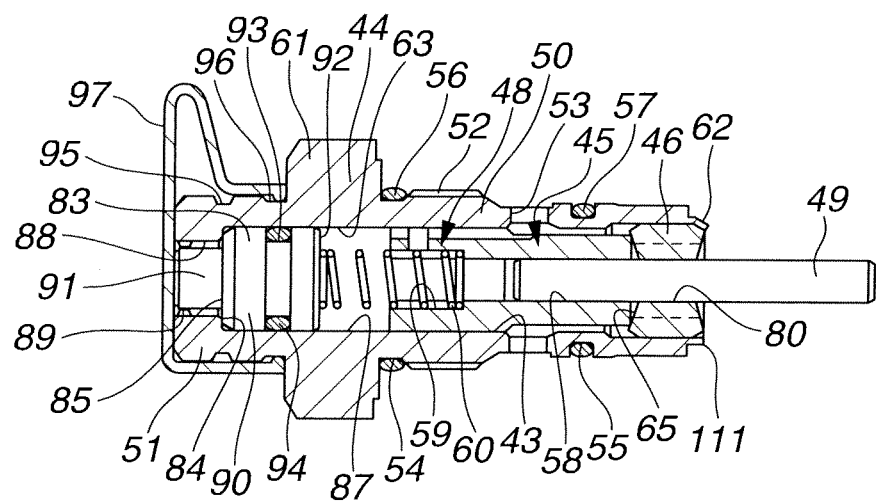
FIG. 5 is an enlarged view showing the first or second valve 40 or 41 after the press-fit position adjustment of spring pin 49 according to the second embodiment.

Stroke adjusting member 83 shown in FIGS. 4 and 5 (serving as a movable adjusting member) is made up of a stopper portion 90 and a smaller portion 91 The outside diameter of stopper portion 90 is slightly smaller than the inside diameter of the stroke adjuster receiving portion 87 of valve body 44 so that the stopper portion 90 can be inserted into the stroke adjuster receiving portion 87. The stopper portion 90 includes a forward end formed with a spring seat 92. Stopper portion 90 includes the outside circumference formed with an annular groove 93 serving as an O ring fitting groove. An O ring 94 is fit in the O ring fitting annular groove 93.

The smaller portion 91 is formed behind (on the rearward side of) the stopper portion 90. The smaller portion 91 is smaller in cross sectional size or diameter than the bolt screw hole 88 of valve body 44. Between the stopper portion 90 and the smaller portion 91, there is formed an annular step shoulder surface 85 facing in the rearward direction and serving as an adjuster's side abutment wall.

<Assembly Operation of Each Valve>

A bolt 86 (serving as a regulating or holding member) is screwed in the bolt screw hole 88 of valve body 44. The length of the threaded portion of bolt 86 is substantially equal to the length of bolt screw hole 88. The stroke adjusting member 83 is inserted into the stroke adjuster receiving portion 87 of valve body 44 from the forward side. In this case, the smaller portion 91 of stroke adjusting member 83 abuts against the bolt 86. In this state, the stroke adjusting member 83 of first valve 40 is located at a predetermined position referred to as a first position with respect to valve body 44, and the stroke adjusting member 83 of second valve 41 is located at a predetermined position referred to as a third position with respect to valve body 44 of second valve 41.

Spring pin 49 is forcibly fit in the spring pin fitting portion 58 of plunger 45. In this case, spring pin 49 is inserted so that the forcible fitting position is relatively short. In this state, the valve seat 46 is inserted from the forward end of spring pin 49 (from the right side as viewed in FIG. 4A). In the state in which the spring pin 49 and valve seat 46 are installed, and the coil spring 48 is inserted in the coil spring receiving portion 59 of plunger 45, the plunger 45 is received slidably in the forward and rearward directions in the plunger receiving portion 43 of valve body 44. The staking portion 62 of the forward end of plunger receiving portion 43 of valve body 44 is joined by staking along the shape of the staking abutment portion 111 of valve seat 46, at a plurality of positions (four positions in this example) arranged regularly in the circumferential direction.

After the assembly of the valve 40 or 41, a protector 97 is attached to valve body 44 by engagement in the protector fitting groove 95 of valve body 44 on the rearward side. The bolt 86 is enclosed in protector 97.

In the thus-assembled valve 40 or 41, the stroke adjusting member 83 is held at the first position (or the third position) with respect to valve body 44. Coil spring 48 is held between the spring seat 60 of plunger 45 and the spring seat 92 of stroke adjusting member 83 and arranged to urge the plunger 45 in the valve closing direction to cause the forward end of plunger 45 to abut against the seat surface 65 of valve seat 46.

When the spring pin 49 is pushed with a force acting against the resilient force of coil spring 48, the plunger 45 can be moved up to the position abutting against the spring seat 92 of stroke adjusting member 83. The coil spring 48 of the valve 40 or 41 is so set (or formed by a spring so selected to have such strengths or characteristics) that the valve 40 or 41 is opened when the pressure is supplied to the first or second pressure chamber 22 or 23, and the pressure becomes higher than a predetermined pressure level, and that the valve 40 or 41 is closed when the operating oil is not supplied to the first or second pressure chamber 22 or 23 and the pressure becomes lower than a predetermined pressure level.

[Adjustment of Press-Fit Position of Spring Pin]

FIG. 5 is an enlarged view showing the first or second valve 40 or 41 after a press-fit position adjustment of spring pin 49 with respect to the spring pin fitting portion 58 of plunger 45. The spring pin fitting position adjusting operation is explained hereinafter with reference to FIGS. 1, 4 and 5.

The first and second valves 40 and 41 are installed in steering housing 11, in the assembled state shown in FIG. 4. In the assembled state shown in FIG. 1, the forward end of spring pin 49 of first valve 40 projects into the first pressure chamber 22, and the axis of first valve 40 or steering pin 49 extends along the sliding direction or axial direction of piston 7. In the assembled state shown in FIG. 1, the forward end of spring pin 49 of second valve 41 projects into the gear chamber 21 (second pressure chamber 23), and the axis of second valve 41 or steering pin 49 extends in a rotational direction of sector gear 9. In this example, the axis of second valve 41 is not parallel to the axis of piston 7 unlike first valve 40.

At the time of the press-fit position adjustment of spring pin 49 of first valve 40, the end of piston 7 abuts against the spring pin 49 of first valve 40 by rotating the steering wheel so as to move the piston 7 toward the first pressure chamber 22. With further rotation of the steering wheel, the plunger 45 moves together with spring pin 49 toward the stroke adjusting member 83, and the plunger 45 abuts on the spring seat 91. With further rotation of the steering wheel, the plunger 45 is held by abutment with spring seat 91 and hence the spring pin 49 is fit or inserted forcibly into the spring pin receiving portion 58 of plunger 45. At the time of the adjustment, the press-fit position of spring pin 49 is determined by turning the steering wheel to a position just before abutment of the steering link mechanism against the link stopper. The position of piston 7 corresponding to the thus-determined press-fit position of spring pin 49 is referred to as a first predetermined position.

At the time of the press-fit position adjustment of spring pin 49 of second valve 41, the side surface of sector gear 9 abuts against the forward end of spring pin 49, by rotating the steering wheel so as to move the piston 7 toward the second pressure chamber 23. The adjusting method per se of second valve 41 is similar to the spring pin fitting position adjustment of spring pin 49 of first valve 40. At the time of the press-fit position adjustment of spring pin 49 of second valve 41, the position of piston 7 just before abutment of the link mechanism against the link stopper is referred to as a second predetermined position.

Thus, just before abutment of a steerable wheel or wheels of the vehicle against the link stopper, the valve 40 or 41 is opened by abutment of the spring pins 49 against piston 7 or sector gear 9.

After the adjustment of the press-fit position of spring pin 49, the bolt 86 in protector 97 is removed. The stroke adjusting member 83 is moved by the resilient force of coil spring 48 (in the rearward, leftward direction), up to the position at which the stroke adjusting member 83 abuts against the adjuster's side abutment wall 85 (second abutment wall, fourth abutment wall) formed at a position confronting the body's side abutment wall 84. In this state, the position of stroke adjusting member 83 with respect to the valve body 44 is referred to as a second position in the case of first valve 40, and as a fourth position in the case of second valve 41. By this operation, it is possible to increase the spacing between the plunger 45 and the spring seat 92 of stroke adjusting member 83, as compared to the state shown in FIG. 4. Thereafter, the protector 97 is attached to valve body 44 by engagement in the protector engagement groove 96 on the forward (right) side.

[Effects] The integral power steering apparatus according to the second embodiment can provide following effects and advantages.

(3) The (first or second) valve body (44) of the first or second (limiter) valve (40 or 41) includes a body's side abutment wall (84) (annular surface facing forwards) (first or third abutment wall) confronting the first or second stroke adjusting member (83), the first or second stroke adjusting member includes an adjuster's side abutment wall (85) (annular surface facing rearwards) (second or fourth abutment wall) confronting the body's side abutment wall (84), and the abutment walls (84, 85) are arranged to separate from each other when the stroke adjusting member is at the first or third position, and to abut one each other when the stroke adjusting member is at the second or fourth position. After the press-fit position adjustment of spring pin 49, the body's side and adjuster's side abutment walls 84 and 85 can determine the position at which the stroke adjusting member 83 is held, so that it is possible to reduce the number of required component parts at the time of usage of the power steering apparatus.

(4) The first or second stroke adjusting member (83) is held at the first position by a bolt (86) (first or second regulating member) provided in the first valve body (44) and arranged to abut on the stroke adjusting member (83), and the stroke adjusting member (83) is allowed to move (from the first or third position) to the second (or fourth) position when the bolt (86) is removed. The stroke adjusting member (83) is held at the first or third position by the bolt 86, so that it is possible to improve the accuracy of the position.

[Third Embodiment]

An integral power steering apparatus according to a third embodiment is different from the apparatus according to the first embodiment, mainly in the construction of the stroke adjusting member or device 83. In the following explanation, the same component parts are given the same reference numerals and repetitive explanation is omitted.

[Details of Each Valve]

Figure 6C:
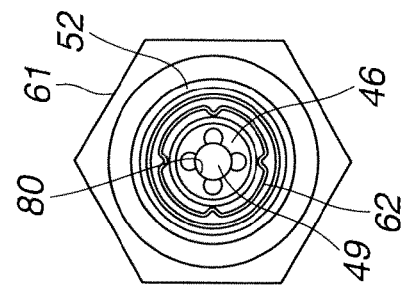
FIG. 6C is an end view of first or second valve 40 or 41 as viewed from the inner side of steering housing 11.
Figure 6A:
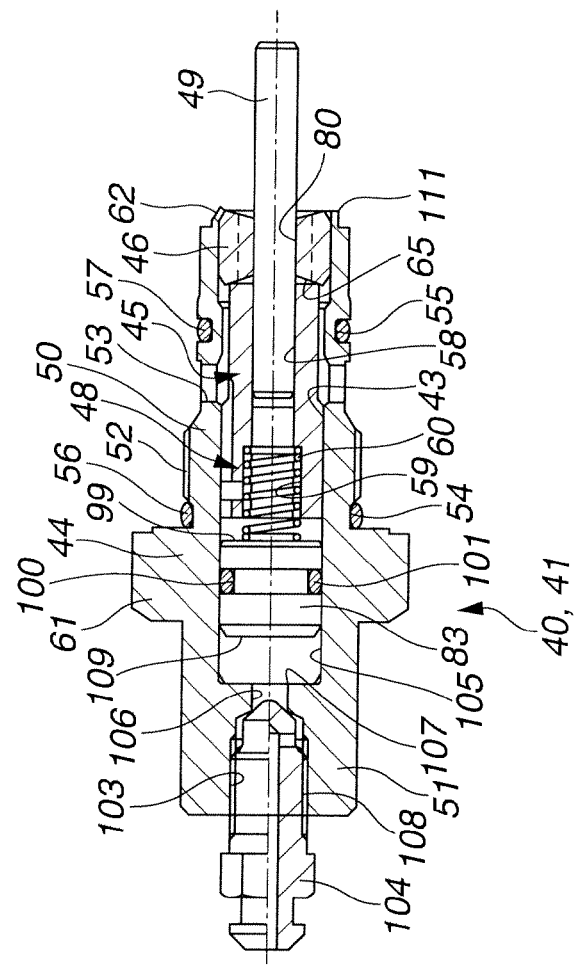
FIG. 6A is a partial longitudinal or axial sectional view of first or second valve 40 or 41.
Figure 6B:
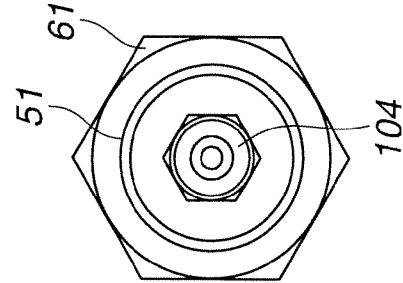
FIG. 6B is an end view of first or second valve 40 or 41 as viewed from the outer side of a steering housing 11.

FIG. 6 is an enlarged view of first or second valve 40 or 41. FIG. 6A is a partial longitudinal or axial sectional view of the first or second valve 40 or 41. FIG. 6B is an end view of the first or second valve 40 or 41 as viewed from the outer side of steering housing 11. FIG. 6C is an end view (forward end view) of first or second valve 40 or 41 as viewed from the inner side of steering housing 11. In this example, first and second valves 40 and 41 are identical in construction to each other.

Each of first and second valves 40 and 41 includes: a valve body 44 having therein a plunger receiving portion 43; a plunger 45 slidably received in the plunger receiving portion 43; a valve seat (or seat portion) 46 abutting on plunger 46 at the time of valve closure; a stroke adjusting member 83 provided behind plunger 45; a coil spring 48 disposed between plunger 45 and stroke adjusting member 83; and a spring pin 49 press-fit (axially) in plunger 45.

[Construction of Valve Body]

Valve body 44 includes an inner portion (or inserted portion or forward portion) 50 inserted in steering housing 11, and an outer portion (or non-inserted portion or rearward portion) 51 formed behind (on the rearward side of) the inner portion 50. Outer portion 51 includes a noncircular head 61 (hexagonal in the example). Inner portion 50 includes an externally threaded portion (or male screw portion) 52 formed in the outer circumference of inner portion 50. The first or second valve 40 or 41 is screwed into steering housing 11 by turning the noncircular head 61 of valve body 44 with a tool such as a screw wrench).

Valve body 44 includes a through hole 53 extending radially inwards from the outer circumference of valve body 44 to the plunger receiving portion 43, at an axial position adjacent to the threaded portion 52. This through hole 53 is connected with seventh fluid passage 42 (formed in steering housing 11 to connect the first and second valves 40 and 41). Valve body 44 further includes annular grooves 54 and 55 (or O ring fitting grooves) formed in the outer circumference of inner portion 50 at such axial positions that the threaded portion 52 and through hole 53 are located axially between the annular grooves 54 and 55. O rings 56 and 57 are fit, respectively, in annular grooves 54 and 55.

Valve body 44 further includes a stroke adjuster receiving portion 105 formed behind (on the rearward side of) the plunger receiving portion 43. The stroke adjuster receiving portion 105 communicates with the plunger receiving portion 43. Behind the stroke adjuster receiving portion 105 (that is, on the rearward side of stroke adjuster receiving portion 87), there is formed a bleeder screw hole 103. Between the bleeder screw hole 103 and the stroke adjusting receiving portion 105, there is formed a connection hole 106 having a cross sectional size or a diameter smaller than that of the stroke adjuster receiving portion 105. Between the stroke adjuster receiving portion 105 having the larger cross section on the forward side and the connection hole 106 having the smaller cross section on the rearward side, there is formed an annular step shoulder surface 107 serving as a body's side abutment surface. The bleeder screw hole 103 includes an internally threaded potion 108 formed in the inside circumference. The plunger receiving portion 43 extends axially to an open inner end on the steering housing's side. Around the open inner end of plunger receiving portion 43, there is formed a staking portion 62 made thinner in wall thickness than the remaining circumferential wall.

<Construction of Plunger>

Plunger 45 is a hollow member including an axially extending stepped through hole including a smaller segment 58 having a smaller sectional size or diameter and serving as a spring pin receiving portion, a larger segment 59 having a larger sectional size or diameter and serving as a coil spring receiving portion, and an annular step shoulder surface 60 serving as a spring seat facing axially in the rearward direction.

<Construction of Valve Seat (Seat Portion)>

Valve seat 46 of the valve 40 or 41 is a hollow cylindrical portion or member having an axially extending through hole 80 serving as a spring pin receiving portion. Valve seat 46 includes an outer inclined surface 111 serving as a staking abutting portion (formed at the forward end of valve seat 46) and an inner inclined surface 65 serving as a seat surface (formed at the rearward end of valve seat 46). The outer inclined surface 111 extends, obliquely as viewed in FIG. 6A, from an intermediate point so located that a radial distance from the outside circumference of valve seat 46 is equal to about one-third of the wall thickness of the cylindrical wall, to an outer point on the outside circumference of valve seat 46. In this example, the outer inclined surface 111 is in the form of an outside conical surface. The inner inclined surface 65 serving as the seat surface extends, obliquely as viewed in FIG. 6A, from an intermediate point so located that a radial distance from the outside circumference of valve seat 46 is equal to about one-third of the wall thickness of the cylindrical wall, to an inner point on the inside circumference of valve seat 46. In this example, the inner inclined surface 65 is in the form of an inside conical surface. In this example, the outer inclined surface (111) and the inner inclined surface (65) are formed on both ends of valve seat 46.

<Construction of Spring Pin>

Spring pin 49 is in the form of a rod having a circular cross section or round bar. The outside diameter of spring pin 49 is so set as to enable press-fitting of spring pin 49 in the spring pin fitting portion 58 of plunger 45.

<Construction of Stroke Adjusting Member>

The outside diameter of stroke adjusting member 83 is slightly smaller than the inside diameter of the stroke adjuster receiving portion 105 of valve body 44 so that the stroke adjusting member 83 can be inserted into the stroke adjuster receiving portion 105. The stroke adjusting member 83 includes a forward end formed with a spring seat 99. Stroke adjusting member 83 includes the outside circumference formed with an annular groove 100 serving as an O ring fitting groove. An O ring 101 is fit in the O ring fitting annular groove 100. The rearward end of the stroke adjusting member 83 is formed with an adjuster's side abutment surface 109.

<Assembly Operation of Each Valve>

A bleeder 104 (serving as a regulating or holding member) is screwed in the bleeder screw hole 103 of valve body 44. A liquid or holding liquid is injected into the stroke adjuster receiving portion 105 of valve body 44. The stroke adjusting member 83 (serving as a movable adjusting member) is inserted into the stroke adjuster receiving portion 1057 of valve body 44 from the forward side.

Spring pin 49 is forcibly fit in the spring pin fitting portion 58 of plunger 45. In this case, spring pin 49 is inserted so that the forcible fitting position or press-fit position is relatively short. In this state, the valve seat 46 is inserted from the forward end of spring pin 49 (from the right side as viewed in FIG. 6A). In the state in which the spring pin 49 and valve seat 46 are installed, and the coil spring 48 is inserted in the coil spring receiving portion 59 of plunger 45, the plunger 45 is received slidably in the forward and rearward directions in the plunger receiving portion 43 of valve body 44. The staking portion 62 of the forward end of plunger receiving portion 43 of valve body 44 is joined by staking along the shape of the staking abutment portion 111 of valve seat 46, at a plurality of positions (four positions in this example) arranged regularly in the circumferential direction.

In the thus-assembled valve 40 or 41, the holding liquid is filled and sealed in the stroke adjuster receiving portion 105, so that the holding liquid regulates movement of stroke adjusting member 83. The stroke adjusting member 83 is held at the first position in the case of first valve 40 or the third position in the case of second valve 41, with respect to valve body 44. Coil spring 48 is held between the spring seat 60 of plunger 45 and the spring seat 99 of stroke adjusting member 83 and arranged to urge the plunger 45 in the valve closing direction to cause the forward end of plunger 45 to abut against the seat surface 65 of valve seat 46.

When the spring pin 49 is pushed with a force acting against the resilient force of coil spring 48, the plunger 45 can be moved up to the position abutting against the spring seat 99 of stroke adjusting member 83. The coil spring 48 of the valve 40 or 41 is so set (or formed by a spring so selected to have such strengths or characteristics) that the valve 40 or 41 is opened when the pressure is supplied to the first or second pressure chamber 22 or 23, and the pressure becomes higher than a predetermined pressure level, and that the valve 40 or 41 is closed when the operating oil is not supplied to the first or second pressure chamber 22 or 23 and the pressure becomes lower than a predetermined pressure level.

[Adjustment of Press-Fit Position of Spring Pin]

Figure 7:
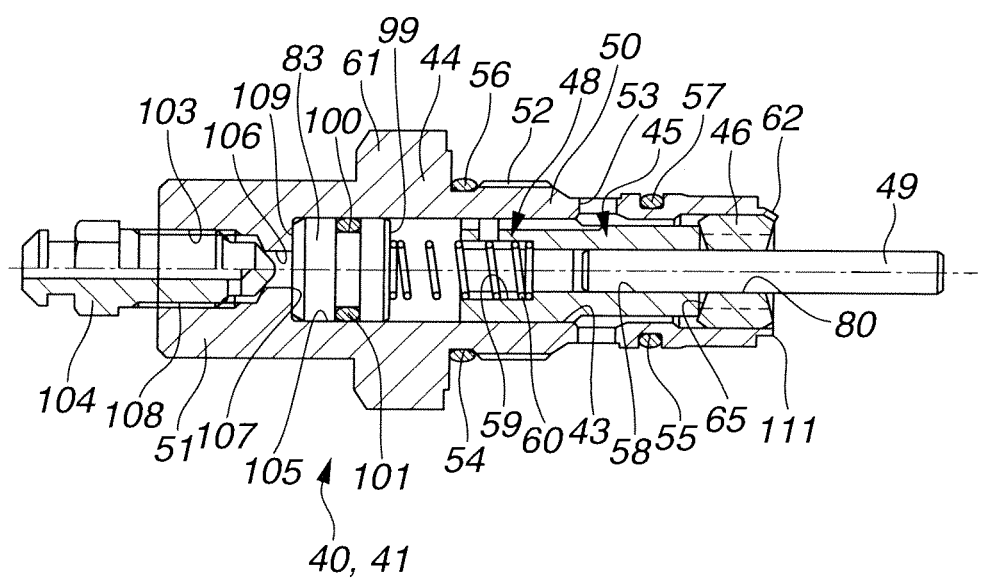
FIG. 7 is an enlarged view showing the first or second valve 40 or 41 after the press-fit position adjustment of spring pin 49 according to the third embodiment.

FIG. 7 is an enlarged view showing the first or second valve 40 or 41 after the press-fit position adjustment of spring pin 49 with respect to the spring pin fitting portion 58 of plunger 45. The spring pin fitting position adjusting operation is explained hereinafter with reference to FIGS. 1, 6 and 7.

The first and second valves 40 and 41 are installed in steering housing 11, in the assembled state shown in FIG. 6. In the assembled state shown in FIG. 1, the forward end of spring pin 49 of first valve 40 projects into the first pressure chamber 22, and the axis of first valve 40 or steering pin 49 extends along the sliding direction or axial direction of piston 7. In the assembled state shown in FIG. 1, the forward end of spring pin 49 of second valve 41 projects into the gear chamber 21 (second pressure chamber 23), and the axis of second valve 41 or steering pin 49 extends in a rotational direction of sector gear 9.

At the time of the press-fit position adjustment of spring pin 49 of first valve 40, the end of piston 7 abuts against the spring pin 49 of first valve 40 by rotating the steering wheel so as to move the piston 7 toward the first pressure chamber 22. With further rotation of the steering wheel, the plunger 45 moves together with spring pin 49 toward the stroke adjusting member 83, and the plunger 45 abuts on the spring seat 99. With further rotation of the steering wheel, the plunger 45 is held by abutment with spring seat 99 and hence the spring pin 49 is fit or inserted forcibly into the spring pin receiving portion 58 of plunger 45. At the time of the adjustment, the press-fit position of spring pin 49 is determined by turning the steering wheel to a position just before abutment of the steering link mechanism against the link stopper. The position of piston 7 corresponding to the thus-determined press-fit position of spring pin 49 is referred to as a first predetermined position.

At the time of the press-fit position adjustment of spring pin 49 of second valve 41, the side surface of sector gear 9 abuts against the forward end of spring pin 49, by rotating the steering wheel so as to move the piston 7 toward the second pressure chamber 23. The adjusting method per se of second valve 41 is similar to the spring pin fitting position adjustment of spring pin 49 of first valve 40. At the time of the press-fit position adjustment of spring pin 49 of second valve 41, the position of piston 7 just before abutment of the link mechanism against the link stopper is referred to as a second predetermined position.

Thus, just before abutment of the steerable wheel or wheels of the vehicle against the link stopper, the valve 40 or 41 is opened by abutment of the spring pins 49 against piston 7 or sector gear 9.

After the adjustment of the press-fit position of spring pin 49, the bleeder 104 is opened, and the holding liquid is removed from the stroke adjuster receiving portion 105. The stroke adjusting member 83 is moved by the resilient force of coil spring 48 in the rearward, leftward direction), up to the position at which the adjuster's side abutment wall 109 of the stroke adjusting member 83 abuts against the body's side abutment wall 107. In this state, the position of stroke adjusting member 83 with respect to the valve body 44 is referred to as the second position in the case of first valve 40, and as the fourth position in the case of second valve 41. By this operation, it is possible to increase the spacing between the plunger 45 and the spring seat 99 of stroke adjusting member 83, as compared to the state shown in FIG. 6.

[Effects] The integral power steering apparatus according to the third embodiment can provide following effects and advantages.

(5) The position of the stroke adjusting member (83) is regulated at the first (or third) position by the liquid contained in the valve body (44), and the stroke adjusting member (83) can move (from the first or third position) to the second (or fourth) position when the liquid is removed from the valve body (44). Therefore, it is possible to reduce the number of the required component parts without the need for forming a regulating member for regulating the stroke adjusting member at the first or third position.

[Other Embodiments]

Although the invention has been described above with reference to certain embodiments of the invention, the invention is not limited to the embodiments described above. Various modifications and design changes are possible within the purview of the present invention.

For example, in the illustrated example according to the second embodiment, the bolt 86 is removed after the press-fit position adjustment of the spring pin 49. However, it is possible to employ the arrangement in which the bolt is left in the apparatus after the press-fit position adjustment.

Figure 8C:
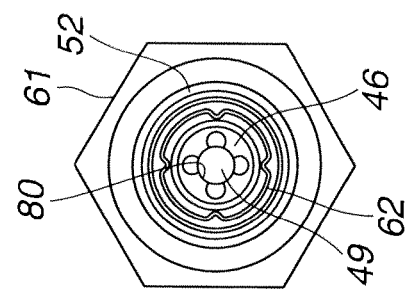
FIG. 8C is an end view of first or second valve 40 or 41 as viewed from the inner side of steering housing 11.
Figure 8A:
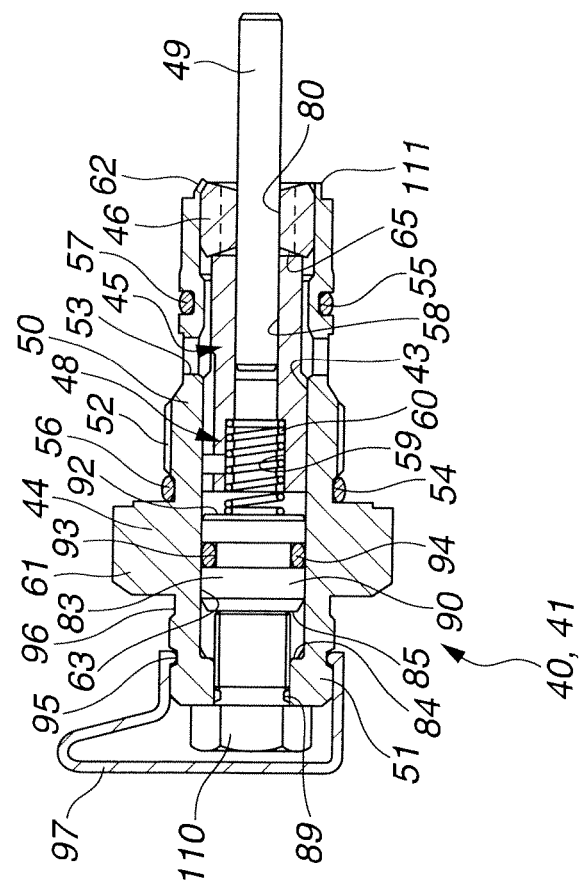
FIG. 8A is a partial longitudinal or axial sectional view of first or second valve 40 or 41.
Figure 8B:
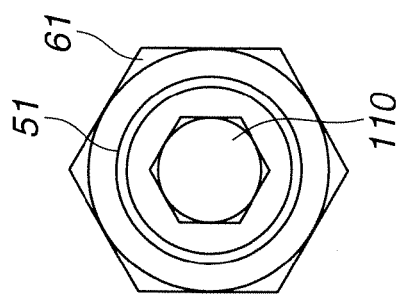
FIG. 8B is an end view of first or second valve 40 or 41 as viewed from the outer side of a steering housing 11.
Figure 9:
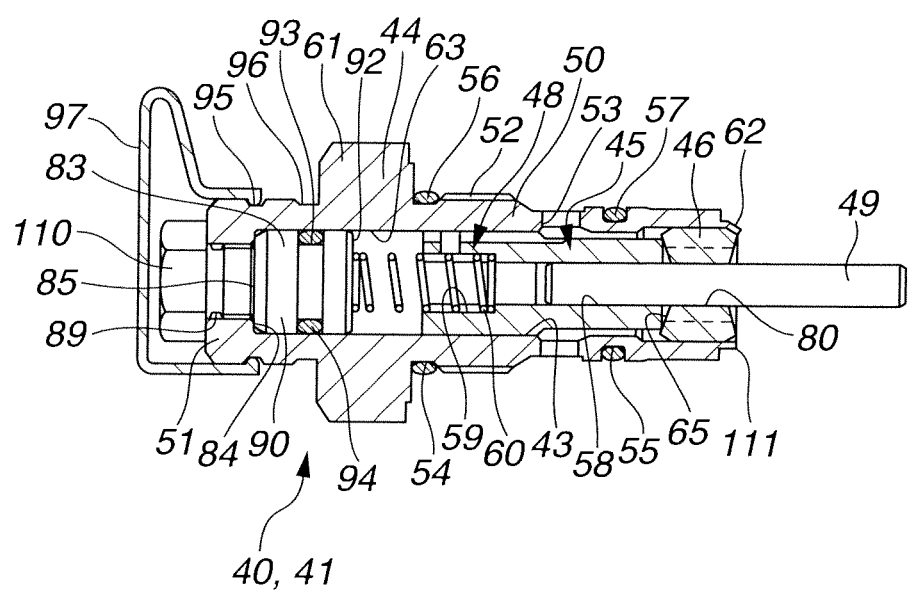
FIG. 9 is an enlarged view showing the first or second valve 40 or 41 after the press-fit position adjustment of spring pin 49 according to the further embodiment.

FIG. 8 (FIGS. 8A, 8B and 8C) is an enlarged view showing one of the first and second valves 40 and 41. FIG. 9 is an enlarged view showing the valve 40 or 41 shown in FIG. 8 after the press-fit position adjustment of spring pin 49 with respect to the spring pin fitting portion 58 of plunger 45.

As shown in FIG. 8, the smaller portion 91 of stroke adjusting member shown in FIG. 4 according to the second embodiment is eliminated, and there is provided a bolt 110 longer than the bolt 86 shown in FIG. 4. With the bolt 110 (serving as a regulating or holding member, the stroke adjusting member 83 is held at the first (or third) position with respect to valve body 44 at the time of the press-fit position adjustment of spring pin 49. After the press-fit position adjustment of spring pin 49, a bolt 110 having the length substantially equal to the length of the bolt screw hole 88 is screwed in the bolt screw hole 88, as shown in FIG. 9.

In the illustrated examples of the preceding embodiments, the second valve 41 is installed in the steering housing 11. However, it is possible to install the second valve 41 in the valve housing 12. In this case, the second valve 41 may be inclined with respect to the stub shaft 2.

Furthermore, it is possible to employ following variations which can be derived from the preceding embodiments.

(a) The housing of the integral power steering apparatus includes a steering body including a hollow cylindrical portion extending axially from a first end to a second, and a bottom closing one of the first and second ends, and an end member or cover, such as a valve housing, closing the other of the first and second ends. In this case, it is possible to simplify the construction of the housing.

(b) The second valve (41) is provided or installed in the end member or cover such as the valve housing. In this case, it is possible to arrange the second valve so that the spring pin of the second valve can abut against the piston (instead of the sector gear).

(c) In the case of the second valve installed in the end member or cover such as the valve housing, the axis of the second valve may be inclined with respect to the input shaft.

In this case, it is possible to improve the flexibility or the degree of freedom of the installation of the second valve.

According to the preceding embodiments explained above, an integral power steering apparatus comprises: a hydraulic actuator (10, 7, 2, 5, 8, 9, 38) including a piston (7) separating first and second pressure chambers (22, 23) from each other for steering assistance; and a limiter valve (40, 41) to be opened by movement of the piston to make fluid connection between the first and second pressure chambers (22, 23) (through a communication passage (42)) when the piston reaches a predetermined limit piston position. The, the limiter valve (40, 41) includes: a valve casing (44, 46) including a plunger receiving (hollow) portion (43) and a valve seat (46); a plunger (45) slidably received in the plunger receiving portion of the valve casing (44, 46) and arranged to close the limiter valve (40, 41) by moving in a forward direction toward the valve seat (46) and abutting on the valve seat (46) and to open the limiter valve by moving in a rearward direction away from the valve seat (46); a coil spring (48) to urge the plunger in the forward direction toward the valve seat (46); a spring pin (49) which includes a forward end portion adapted to be pushed in the rearward direction by the movement of the piston when the piston reaches the predetermined limit piston position, and a rearward end portion press fit in the plunger to move the plunger in the rearward direction to open the limiter valve when pushed by the movement of the piston; and ae press-fit position adjuster (83(47, 75); 83(90, 91)+86; 83+104) disposed in the valve casing, for adjusting a press-fit position of the spring pin press fit in the plunger. The press fit position adjuster includes: a movable adjusting member (47; 83; 83) formed with a forward abutting surface (such as a spring seat) (71, 92, 99) to abut against the plunger to limit rearward movement of the plunger when the movable adjusting member is located at a first (or third) adjuster position in the valve casing; and a regulating or holding member (75; 86; 104)) to hold the movable adjusting member (47; 83; 83) at the first (or third) adjuster position at the time of a press-fit position adjustment, and to enable the movable adjusting member (47; 83; 83) to move from the first adjuster position to a second (or fourth) adjuster position in the rearward direction after the press-fit position adjustment.

This application is based on a prior Japanese Patent Application No. 2011-065349 filed on Mar. 24, 2011. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An integral power steering apparatus comprising:
a housing;
an input shaft adapted to be connected with a steering wheel;
a piston received in the housing and arranged to divide an inside cavity of the housing into a first pressure chamber and a second pressure chamber;
a first translating mechanism provided between the input shaft and the piston and arranged to translate rotational motion of the input shaft into linear motion of the piston in an axial direction;
a second translating mechanism including a rack provided in an outer circumference of the input shaft and a sector gear engaged with the rack, disposed in the second pressure chamber and arranged to translate linear motion of the rack into rotational motion;

a control valve to supply an operating oil supplied from an external pressure source, selectively to the first pressure chamber or the second pressure chamber;

a transmitting mechanism to transmit rotational motion of the sector gear to a steerable wheel; and first and second valves, the first valve being arranged to discharge a fluid pressure in the second pressure chamber toward the first pressure chamber when the piston moves to a first predetermined position in a first direction decreasing a volume of the first pressure chamber, and the second valve being arranged to discharge the fluid pressure in the first pressure chamber toward the second pressure chamber when the piston moves to a second predetermined position in a second direction decreasing a volume of the second pressure chamber;

the first valve including, a first valve body provided on the first pressure chamber's side and formed with a first plunger receiving portion, a first plunger slidably received in the first plunger receiving portion of the first valve body, a first valve seat provided in the first valve body, arranged to form a part of a communication passage connecting the first pressure chamber and the second pressure chamber with each other and arranged to shut off the communication passage by abutment with the first plunger, and open the communication passage by separation of the first plunger from the first valve seat, a first stroke adjusting member which is provided in the first valve body and which includes a first spring seat, a first coil spring which is seated on the first spring seat and which is arranged to urge the first plunger toward the first valve seat, and a first spring pin which includes a first end portion press fit in the first plunger and a second end portion adapted to abut on the piston and which is arranged to separate the first plunger from the first valve seat by moving together with the first plunger by being pushed by the piston, and thereby to connect the first and second pressure chambers, the first stroke adjusting member being arranged to lie at a first position with respect to the first valve body at a time of adjustment of a press-fit position of the first spring pin with respect to the first plunger, and to limit movement of the first plunger by abutting on the first plunger, the first stroke adjusting member being arranged to be held at a second position separated from the first plunger after a press-fit position adjustment of the first spring pin, the second valve includes, a second valve body provided on the second pressure chamber's side and formed with a second plunger receiving portion, a second plunger slidably received in the second plunger receiving portion of the second valve body, a second valve seat provided in the second valve body, arranged to form a part of the communication passage connecting the second pressure chamber and the first pressure chamber with each other and arranged to shut off the communication passage by abutment with the second plunger, and open the communication passage by separation of the second plunger from the second valve seat, a second stroke adjusting member which is provided in the second valve body and which includes a second spring seat, a second coil spring which is seated on the second spring seat and which is arranged to urge the second plunger toward the second valve seat, and a second spring pin which includes a first end portion press fit in the second plunger and a second end portion adapted to abut on one of the piston and the sector gear and which is arranged to separate the second plunger from the second valve seat by moving together with the second plunger by being pushed by the piston or the sector gear, and thereby to connect the first and second pressure chambers, the second stroke adjusting member being arranged to lie at a third position with respect to the second valve body at a time of adjustment of a press-fit position of the second spring pin with respect to the second plunger, and to limit movement of the second plunger by abutting with the second plunger, the second stroke adjusting member being arranged to lie at a fourth position separated from the second plunger after a press-fit position adjustment of the second spring pin.

2. The integral power steering apparatus as claimed in claim 1, wherein the first stroke adjusting member of the first valve includes a first member including the first spring seat and an externally threaded portion, and a second member which is provided in the first valve body and which includes an internally threaded portion screwed over the externally threaded portion of the first member, the first stroke adjusting member of the first valve being arranged to be moved from the first position to the second position by rotating the first member with respect to the second member; the second stroke adjusting member of the second valve includes a third member including the second spring seat and an externally threaded portion, and a fourth member which is provided in the second valve body and which includes an internally threaded portion screwed over the externally threaded portion of the third member, the second stroke adjusting member of the second valve being arranged to be moved from the third position to the fourth position by rotating the first member with respect to the second member.

3. The integral power steering apparatus as claimed in claim 1, wherein the first valve body of the first valve includes a first abutment wall confronting the first stroke adjusting member, the first stroke adjusting member includes a second abutment wall confronting the first abutment wall, and the first and second abutment walls are arranged to separate from each other when the first stroke adjusting member is at the first position, and to abut one each other when the first stroke adjusting member is at the second position; and wherein the second valve body of the second valve includes a third abutment wall confronting the second stroke adjusting member, the second stroke adjusting member includes a fourth abutment wall confronting the third abutment wall, and the third and fourth abutment walls are arranged to separate from each other when the second stroke adjusting member is at the third position, and to abut one each other when the second stroke adjusting member is at the fourth position.

4. The integral power steering apparatus as claimed in claim 3, wherein the first stroke adjusting member is held at the first position by a first regulating member provided in the first valve body and arranged to abut on the first stroke adjusting member, and the first stroke adjusting member is allowed to move to the second position when the first regulating member is removed; and wherein the second stroke adjusting member is held at the third position by a second regulating member provided in the second valve body and arranged to abut on the second stroke adjusting member, and the second stroke adjusting member is allowed to move to the fourth position when the second regulating member is removed.

5. The integral power steering apparatus as claimed in claim 3, wherein the first stroke adjusting member is held at the first position by a liquid contained in the first valve body, and the first stroke adjusting member is allowed to move to the second position when the liquid is removed from the first valve body; and wherein the second stroke adjusting member is held at the third position by the liquid contained in the second valve body, and the second stroke adjusting member is allowed to move to the fourth position when the liquid is removed from the second valve body.

6. The integral power steering apparatus as claimed in claim 1, wherein the housing includes a steering housing including a cylindrical wall and an end wall closing a first end of the cylindrical wall, and an end member closing a second end of the cylindrical wall.

7. The integral power steering apparatus as claimed in claim 6, wherein the second valve is installed in the end member.

8. The integral power steering apparatus as claimed in claim 6, wherein the second valve is inclined with respect to the input shaft.

* * * * *